United States Patent [19]

Tamura

[11] Patent Number: 4,509,165

[45] Date of Patent: Apr. 2, 1985

[54] MINIATURIZED ANTENNA DUPLEXER USING SAW FILTER

[75] Inventor: Yoshiharu Tamura, Tokyo, Japan

[73] Assignee: Nippon Electric Co., Ltd., Tokyo, Japan

[21] Appl. No.: 452,388

[22] Filed: Dec. 22, 1982

[30] Foreign Application Priority Data

Dec. 22, 1981 [JP] Japan .............................. 56-192325[U]

[51] Int. Cl.³ ........................... H03H 9/00; H04B 1/40
[52] U.S. Cl. ......................................... 370/38; 370/30; 455/83; 455/286; 333/194
[58] Field of Search ...................... 370/38, 30; 455/82, 455/83, 80, 286; 333/185, 194

[56] References Cited

U.S. PATENT DOCUMENTS 4,126,838 11/1978 McCusker et al. .................. 358/188
4,267,597 5/1981 Volpi et al. ............................ 370/32

OTHER PUBLICATIONS

IEEE, 1981, "Miniaturized Microwave Filter Construction with Dielectric-Loaded Resonator and Space Coupling", by: Atsushi Fukasawa, Takuro Sato & Kenchuro Hosoda.

Primary Examiner—Robert L. Griffin
Assistant Examiner—Timothy K. Greer
Attorney, Agent, or Firm—Laff, Whitesel, Conte & Saret

[57] ABSTRACT

An antenna duplexer is made compact by a use of a SAW filter, and yet it eliminates the possibility that the SAW filter might be burned, and it avoids additional circuits, e.g., an impedance compensation circuit. The antenna duplexer comprises a local oscillation filter. A reception filter is coupled to the local oscillation filter. The coupled side is partly constituted by a SAW filter. A transmission filter is coupled to the reception filter and an antenna is coupled between the reception filter and the transmission filter.

10 Claims, 7 Drawing Figures

MINIATURIZED ANTENNA DUPLEXER USING SAW FILTER

BACKGROUND OF THE INVENTION

The present invention relates to an antenna duplexer for use in a radio communication apparatus.

Generally, a radio communication apparatus requires an antenna duplexer in order to use a single antenna commonly for transmission and reception. Various constructions of antenna duplexers are now available, depending on the type of circuit arrangement of a transceiver. It is well known to use a cascade circuit having local oscillation filter, reception filter and transmission filter when a received signal is directly applied to a first mixer. The pass bands of the local oscillation, reception and transmission filters are respectively set at the first local oscillator frequency band, reception frequency band and transmission frequency band.

It has been customary to construct such an antenna duplexer by a use of helical filters, dielectric filters, planar line filters or the like. An example of antenna duplexers using dielectric filters is disclosed in Fukusawa's "Miniaturized Microwave Filter Construction with Dielectric-Loaded Resonator and Space Coupling," IEEE MTT-S I.M.S. Digest, pp 209–211, June 16, 1981.

In parallel with the remarkable progress in the production of compact and more economical radio communication apparatuses, there is an increasing demand for reductions both in size and in cost of antenna duplexers, as well as for various circuit elements such as semiconductors. The helical filters, dielectric filters, planar line filters or the like occupy a substantial volume at the present stage of development, although efforts have been made to provide a more compact design. Additionally, such filters require some degrees of adjustment to satisfy expected characteristics. Concerning a more compact and economical antenna duplexer, the above-mentioned traditional filter arrangement has almost lost its prospect and is one of stumbling blocks for further improvements.

Meanwhile, SAW (surface acoustic wave) devices are also known as filter elements and are now rapidly progressing toward practical use. The use of SAW filters is now rapidly increasing in practical applications. Moreover, because a SAW filter is manufactured by electron beam exposure, photoetching, dry etching or a similar technique, any inaccuracy at the production stage is almost too small to require adjustments only if due consideration is given to design conditions for attaining desired characteristics.

However, SAW filters still involve the following problem when applied to antenna duplexers. A commonly-used and small-sized radio communication apparatus usually generates about several hundreds mW to several W output power. In such high power operation, the SAW filter is likely to be burned by heat generation which occurs due to an insertion loss of the transmission filter and by a low voltage immunity to a transmission signal which the reception filter reflects outside its pass band. This is due to the fact that the SAW filter inevitably requires a minute electrode pattern. In addition, it is difficult under the present situation to solve the problem concerned with relying on further improvements in performance or on similar measures.

SUMMARY OF THE INVENTION

It is therefore an object of the present invention to provide an antenna duplexer which is made compact by a use of a SAW filter and yet which eliminates the possibility that the SAW filter may be burned.

It is another object of the present invention to provide an antenna duplexer which shows satisfactory electrical characteristics without requiring any additional circuit, e.g., impedance compensation circuit.

In accordance with the present invention, an antenna duplexer comprises a local oscillation filter for generating a local oscillation frequency, the filter comprises a SAW filter. A reception filter for selecting a particular reception frequency is coupled with local oscillation filter and has a coupled side which is partly constituted by a SAW filter. A transmission filter for selecting a particular transmission frequency is coupled to the reception filter and an antenna is coupled between the reception filter and the transmission filter.

BRIEF DESCRIPTION OF THE DRAWINGS

Other objects, features and advantages of the present invention will be described with reference to the accompanying drawings, in which.

DESCRIPTION OF THE PREFERRED EMBODIMENTS

Figure 1:
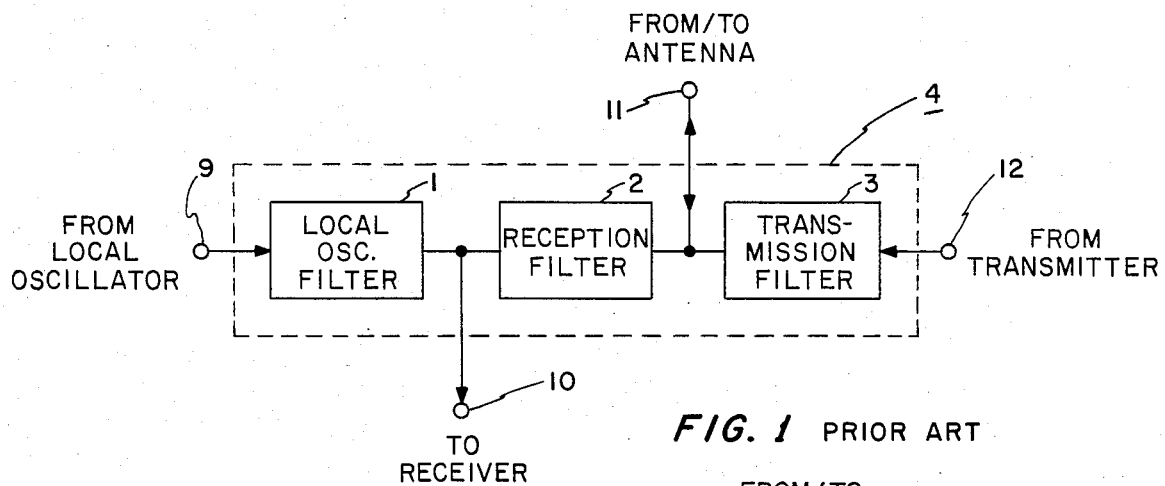
FIG. 1 is a block diagram of a conventional antenna duplexer.

Referring to FIG. 1, the prior art antenna duplexer is generally designated by the reference numeral 4 and includes a local oscillation filter 1, a reception filter 2 and a transmission filter 3. A local oscillator signal from the first stage local oscillator (not shown) is coupled to a terminal 9 and passed through the local oscillation filter 1 to a terminal 10, for making a connection with a receiver. A signal coming in through an antenna (not shown) appears at a terminal 11 and is fed therefrom to the terminal 10 via the reception filter 2. Meanwhile, a signal is supplied to a terminal 12, from a transmitter (not shown), and is routed to the terminal 11 via the transmission filter 3.

In the conventional antenna duplexer 4 shown in FIG. 1 each of the filters comprises a helical filter, a dielectric filter or a planar line filter which potentially conflicts with the demand for a miniature design, as previously described.

Figure 2:
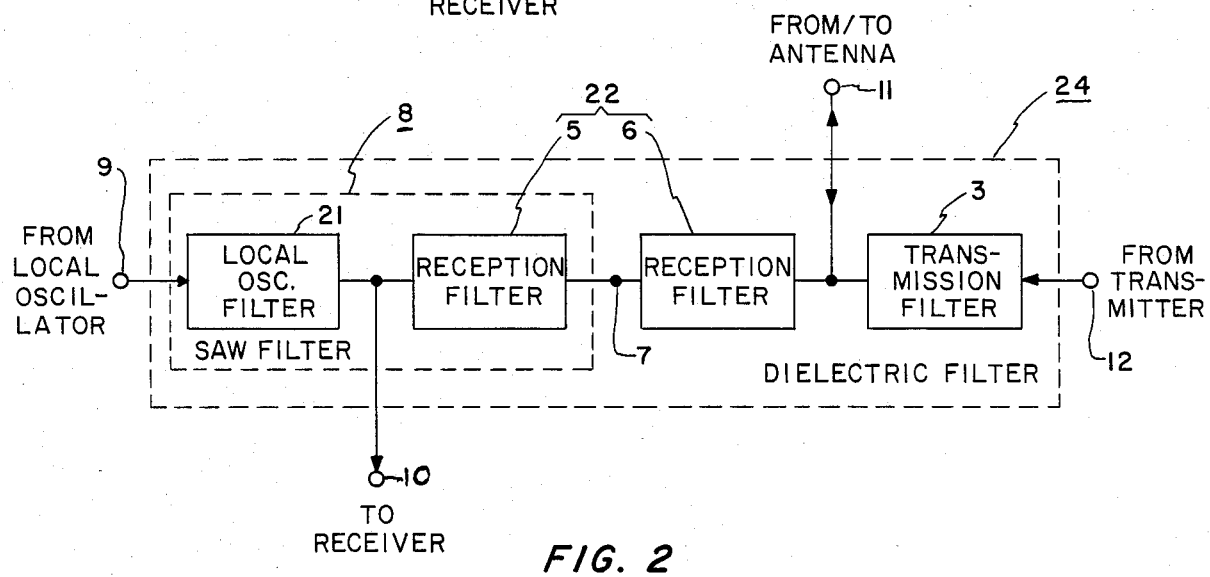
FIG. 2 is a block diagram illustrating the fundamental concept of an antenna duplexer of the present invention.

Referring to FIG. 2, a reception filter 22 is made up of a first section 5 connected with a local oscillation filters 21 and a second section 6 connected with a transmission filter 3. The two filter sections 5 and 6 are connected together at a junction 7. The local oscillation filter 21 and reception filter section 5 constitute, in combination, a SAW filter, as designated by the reference numeral 8. The other reception filter 6 and the transmission filter 3 are commonly of the nature which is free from the danger of a burnout due to heat generation or due to low voltage immunity. Again, a terminal 9 is connected to the first stage local oscillator, a terminal 10 to the first stage mixer of a receiver, a terminal 11 to an antenna and a terminal 12 to a transmitter.

The local oscillation filter 21 attains required passing and attenuating characteristics by means of only a SAW filter. The reception filter 22, as previously mentioned, is made up of two coactive sections. The filters 5 and 6 are used in combination to accomplish a sharp attenuation characteristic which is generally necessary for a reception filter. The filter 6 attenuates a transmission signal to such a low voltage that the SAW filter 5 cannot be burned. Nevertheless it is provided with a minimum necessary number of stages to promote small-sized construction. The transmission filter 3 is constituted by a filter which withstands heat generated due to an insertion loss, because it has to pass power in the range of several hundred milliwatts to several watts.

Generally, a high frequency filter has its input and output terminals terminated by a characteristic impedance Zo, which provides an input/output impedance which defines the passing and attenuating characteristics. However, if the high frequency filter is used with an input/output impedance which is different from the impedance Zo, the required characteristics may sometimes fail to be attained. This becomes more prominent as the number of the filter stages becomes smaller.

Although such a problem is expected to arise at the junction 7 between the filters 5 and 6, the present invention substantially avoids such a problem as will be described in detail hereunder.

As well known, in the art, the input/output impedance within the pass band of a filter is approximately the same as the characteristic termination impedance. However, it differs greatly from the characteristic impedance within the attenuation ranges. Stated another way, in the attenuation ranges, the filter has a large reflection coefficient, relative to the characteristic impedance. It will be clear from FIG. 2 that one of the filters 5 and 6 is terminated by the input impedance of the other, at the junction 7. This input impedance, as stated above, differs greatly from the characteristic impedance Zo outside the pass band.

As generally understood, a SAW filter has an input/output impedance which does not constitute a complete reactance even outside of its pass band, but it has a value which involves a certain real part. In contrast, a helical filter, a dielectric resonator filter or a planer line filter has an impedance the real part of which is very small, outside the pass band, and the real part can almost be regarded as only a reactance. Thus, the reflection coefficient looking from the junction 7 into the other filter has an absolute value which can be regarded substantially as "1", outside the pass band. This will be discussed in more detail with reference to FIG. 3.

Figure 3:
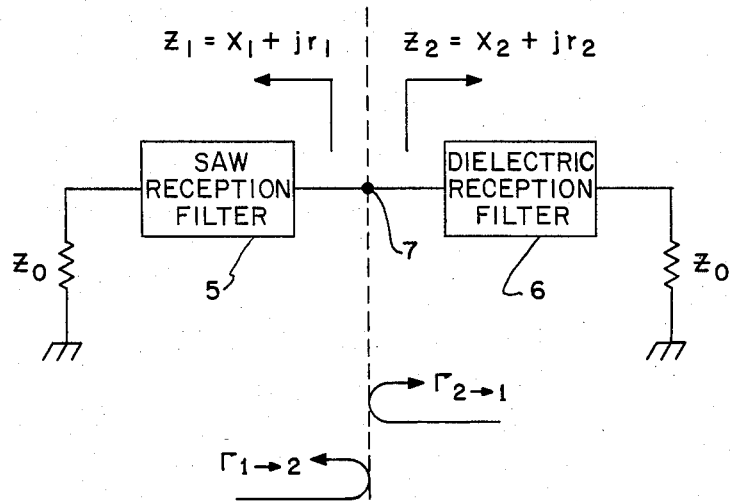
FIG. 3 is a diagram for describing impedance matching at the junction of different kinds of interconnected filters.

Referring to FIG. 3, $Z_1$ and $Z_2$ are the input impedances of the filters 5 and 6, respectively, each being measured under the condition where the outputs of the filters 5 and 6 are terminated with a defined characteristic impedance Zo.

Supposing that a power source having a signal source impedance Zs is connected with the port of an input impedance Z, then the reflection coefficient $\Gamma_{in}$ may be expressed as:

$$\Gamma_{in} = \frac{Z - Zs}{Z + Zs^*}$$

where $Zs^*$ represents the complex conjugate of Zs. Applying this situation to FIG. 3 where $Z=Z_1$ and $Zs=Z_2$ and supposing $Z_1=X_1+jY_1$ and $Z_2=X_2+jY_2$, the reflection coefficient $\Gamma_{2\rightarrow 1}$ looking into the filter 5 is obtained as:

$$\Gamma_{2\rightarrow 1} = \frac{Z_1 - Z_2}{Z_1 + Z_2^*}$$

Therefore, the absolute value of $\Gamma_{2\rightarrow 1}$ is given by:

$$\left|\Gamma_{2\rightarrow 1}\right| = \left|\frac{(X_1 - X_2) + j(Y_1 - Y_2)}{(X_1 + X_2) + j(Y_1 - Y_2)}\right| = \frac{\{(X_1 - X_2)^2 + (Y_1 - Y_2)^2\}^{\frac{1}{2}}}{\{(X_1 + X_2)^2 + (Y_1 - Y_2)^2\}^{\frac{1}{2}}}$$

As previously mentioned, because the real part in the attenuation ranges is $X_1 > X_2$, the relationship $(X_1-X_2)^2 \approx X_1^2$ and $(X_1+X_2)^2 \approx X_1^2$ can be considered to hold:

$$|\Gamma_{2\rightarrow 1}| \approx 1$$

Likewise, supposing $Z=Z_2$ and $Zs=Z_1$, then:

$$|\Gamma_{1\rightarrow 2}| \approx 1$$

It is therefore apparent that the reflection coefficient looking into the other filter from the junction 7 must be substantially "1", in the attenuation ranges. This minimizes the possibility of the impedance mismatching which degrades the attenuation characteristic, so that the filters 5 and 6 can be directly connected to each other without any impedance compensation circuit.

An antenna duplexer having the construction shown in FIG. 2 was manufactured and used for experiment, supposing its application to an 800 MHz band. The dimensions of the manufactured antenna duplexer are shown in millimeter in FIG. 4. The local oscillation filter 21 (FIG. 2) and reception filter section 5 were constituted by a SAW filter. The other reception filter section 6 and transmission filter 3 were constituted by a dielectric filter. The SAW filter was accommodated in a shielded package 108 and the dielectric filter in another one 103. While the reception filter needs only to satisfy the required characteristics as a combination of the dielectric and SAW filters. The duplexer in this embodiment was designed to allocate the sharp attenuation characteristic to the SAW filter, as much as possible, and to supplement the remaining required attenuation characteristic with the characteristic of the dielectric filter which was inserted for attaining high voltage immunity.

The transmission filter had a pass band of 5 MHz and comprised a 3-stage dielectric filter. The dielectric filter section of the reception filter, for insuring high voltage immunity was made up of two stages. The SAW filter 8 was constructed by loading the reception filter section 5 and local oscillation filter 21 on a common single chip.

Figure 4:
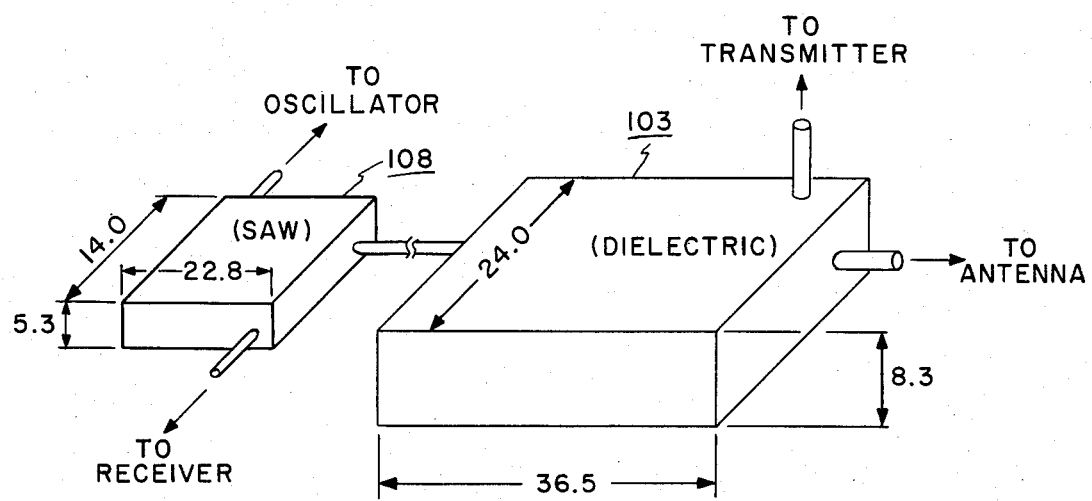
FIG. 4 is a perspective view of an antenna duplexer manufactured and tested in accordance with the present invention.

As seen in FIG. 4, the dielectric filter and SAW filter were accommodated in separate shielded cases 103 and 108 to facilitate an optimum manner of installation and of measurement of their specific characteristics. The total volume of the two filters was about 9 cm$^3$ which was about 30% smaller than a 3-stage transmission, 4-stage reception and 2-stage local oscillation type of filter constituted solely by a dielectric filter.

Although the SAW and dielectric filter were accommodated in separately shielded cases, to evaluate characteristics of each filter, they can also be accommodated in a single shielded package. In such a case, a higher degree of miniaturization is expected. Experiments show that the total volume of such a filter will be around 6 cm$^3$, a 50 percent reduction in volume, as compared with the conventional dielectric filter.

The frequency characteristics of the filters shown in FIG. 4 will be described, referring to FIGS. 5 to 7.

Figure 5:
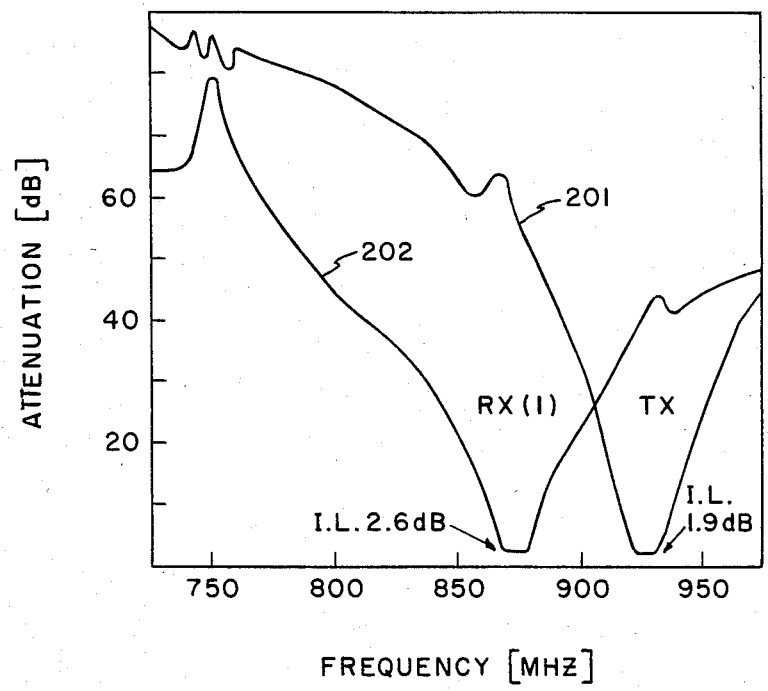
FIG. 5 is a graph showing the transmission characteristic of a dielectric filter used for the antenna duplexer shown in FIG. 4.

In FIG. 5, a curve 201 represents the transmission or propagation characteristic of the transmission filter which was measured to give an insertion loss of not more than 1.9 dB at the frequencies of 932.5±7.5 [MHz]. A curve 202, on the other hand, represents the propagation characteristic of the dielectric filter section (6) of the reception filter which was measured to give an insertion loss of not more than 2 dB at the frequencies of 877.5±7.5 [MHz].

Figure 6:
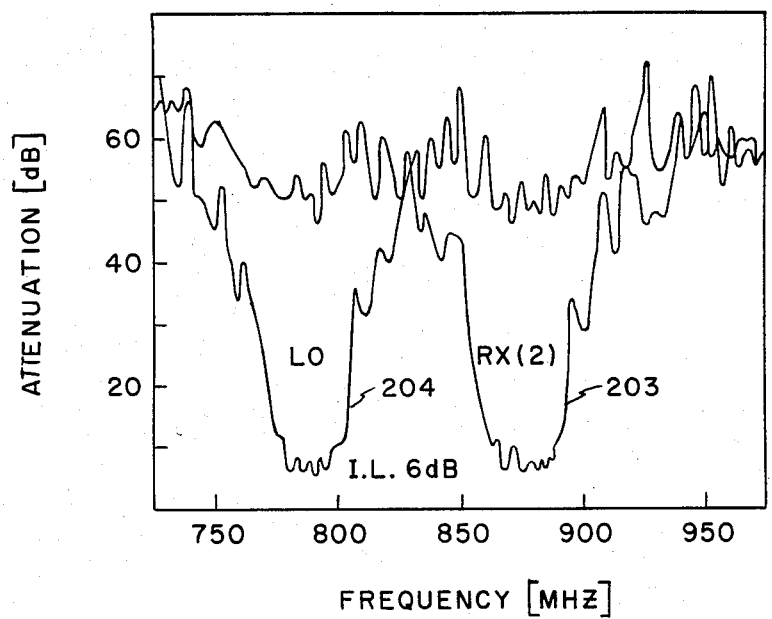
FIG. 6 is a graph showing the transmission characteristic of a SAW filter used for the antenna duplexer shown in FIG. 4.

Similarly, in FIG. 6, a curve 203 shows the characteristic of the SAW filter section (5) of the reception filter which gave an insertion loss of not more than 6 dB at 877.5±7.5 [MHz]. Likewise, a curve 204 shows the characteristic of the local oscillation filter which was measured to give an insertion loss of not more than 6 dB at 787.5±7.5 [MHz].

Figure 7:
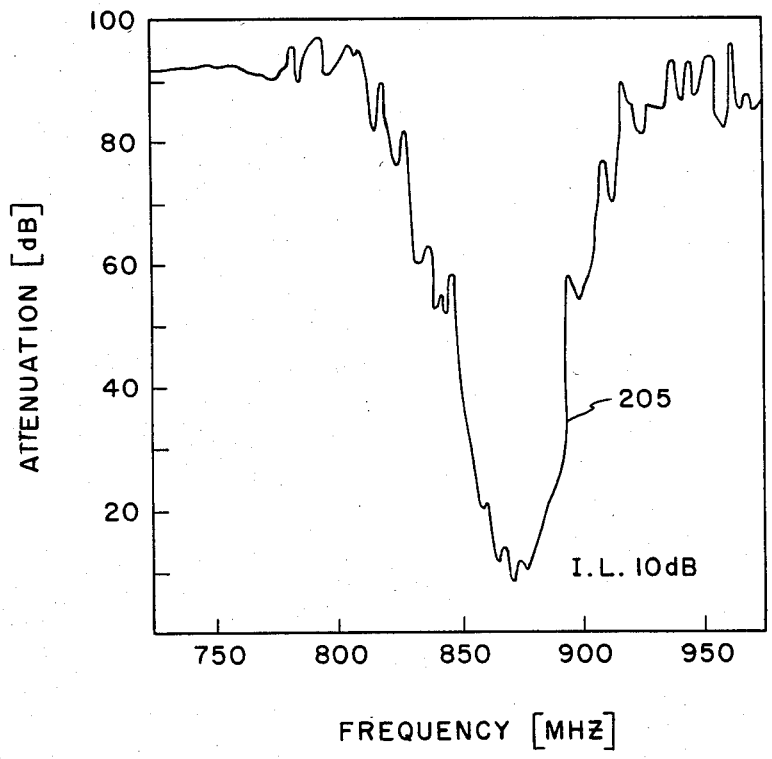
FIG. 7 is a graph showing the total characteristic of a reception filter of FIG. 4.

Further, the total characteristic of the combined dielectric and SAW filters of the reception filter is shown in FIG. 7 which had an insertion loss of not more than 10 dB at 877.5±7.5 [MHz].

It will be apparent from the curves shown in FIGS. 5 to 7 that the antenna duplexer of this embodiment is small and yet satisfactory in characteristic.

In summary, it will be seen that the present invention provides an antenna duplexer which is far more compact and economical than prior art duplexers because as many of its filters as possible are constituted by a SAW filter. Such a duplexer eliminates the burnout of the SAW filter, which is susceptible to large power and high voltage. Also, it eliminates a need for an impedance compensation circuit or the like despite the direct interconnection of different kinds of filters, thereby contributing a great deal to the production of compact and more economical radio communication apparatus.

What is claimed is:

1. An antenna duplexer comprising:
   first filter means for a local oscillation frequency, said first filter means being comprised of a first surface acoustic wave filter;
   second filter means for a reception frequency, said second filter means having first and second sections, said first section being coupled to said first filter means and being comprised of a second surface acoustic wave filter, said second section having low susceptibility to burnout at the voltage of a transmission signal;
   third filter means for the frequency of said transmission signal, said third filter means being coupled to said second section; and
   antenna means coupled between said second section and said filter means.

2. An antenna duplexer as claimed in claim 1, in which said first, second and third filter means are accommodated in a single package.

3. An antenna duplexer as claimed in claim 1 or 2, in which both said second section and said third filter means comprise dielectric filters.

4. An electronic circuit comprising:
   first filter means coupled to a local oscillator, said first filter means including a first surface acoustical wave filter tuned to pass the output of said local oscillator;
   second filter means tuned to a reception frequency and having two sections, one of said sections comprising a second surface acoustic wave filter coupled to the output of said first filter means and to a receiver, and the other of said sections comprising a filter having low susceptibility to burnout for the purpose of burnout prevention connected to said second surface acoustical wave filter and having immunity to burnout at the voltage of a transmission signal; and
   third filter means tuned to the frequency of said transmission signal and coupled to said burnout-prevention filter and to a transmitter, the coupled-point of said third filter means and said burnout-prevention filter being coupled to an antenna.

5. The circuit of claim 4 wherein said filter having low susceptibility to burnout includes a dielectric filter.

6. The circuit of claim 5 wherein said first filter means and second surface acoustic wave filter is accommodated within a first shielded case and said dielectric filter and third filter means are accommodated within a second shielded case.

7. The circuit of claim 4 wherein said third filter means has a loss which does not exceed 1.9 dB at about (932.5±7.5)MHz.

8. The circuit of claim 5 wherein said second filter means has a loss which does not exceed 2.6 dB at about (8.77±7.5)MHz.

9. The circuit of claim 7 wherein said second filter means has a loss which does not exceed 2.6 dB at about (8.77±7.5)MHz.

10. An antenna duplexer as claimed in claim 1, in which said first and second sections are directly connected to each other at a junction, the reflection coefficient looking into the other section from said junction being substantially "1" in the attenuation ranges of said second filter means.

* * * * *